(12) United States Patent
Smith et al.

(10) Patent No.: US 7,569,791 B2
(45) Date of Patent: Aug. 4, 2009

(54) INDUCTIVELY-DRIVEN PLASMA LIGHT SOURCE

(75) Inventors: Donald K. Smith, Belmont, MA (US); Matthew M. Besen, Andover, MA (US); Raghuram L. V. Petluri, Woburn, MA (US)

(73) Assignee: Energetiq Technology, Inc., Woburn, MA (US)

( * ) Notice: Subject to any disclaimer, the term of this patent is extended or adjusted under 35 U.S.C. 154(b) by 281 days.

(21) Appl. No.: 11/528,709

(22) Filed: Sep. 27, 2006

(65) Prior Publication Data

US 2007/0075053 A1    Apr. 5, 2007

Related U.S. Application Data

(60) Provisional application No. 60/722,605, filed on Sep. 30, 2005.

(51) Int. Cl.
*B23K 10/00* (2006.01)
(52) U.S. Cl. .................. 219/121.57; 219/121.43; 315/111.51; 156/345.45; 204/298.31
(58) Field of Classification Search ........... 219/121.43, 219/121.41, 121.54, 121.57; 315/111.21, 315/111.51; 156/345.45, 646.1; 204/298.31
See application file for complete search history.

(56) References Cited

U.S. PATENT DOCUMENTS

| | | | | |
|---|---|---|---|---|
| 3,500,632 | A | 3/1970 | Anderson | 58/140 |
| 3,757,846 | A * | 9/1973 | Herman, Jr. | 164/499 |
| 3,987,334 | A | 10/1976 | Anderson | 315/57 |
| 4,000,036 | A * | 12/1976 | Ensley | 376/123 |
| 4,042,848 | A | 8/1977 | Lee | 313/231.6 |
| 4,180,763 | A | 12/1979 | Anderson | 315/248 |
| 4,974,227 | A | 11/1990 | Saita et al. | 372/29 |
| 5,681,434 | A * | 10/1997 | Eastlund | 204/156 |
| 5,821,705 | A | 10/1998 | Caporaso et al. | 315/507 |
| 5,990,632 | A | 11/1999 | Smith | 315/248 |
| 6,150,628 | A | 11/2000 | Smith et al. | 219/121.54 |
| 6,359,969 | B1 | 3/2002 | Shmaenok | 378/156 |
| 6,388,226 | B1 | 5/2002 | Smith et al. | 219/121.57 |

(Continued)

FOREIGN PATENT DOCUMENTS

EP        0 890 977        1/1999

(Continued)

OTHER PUBLICATIONS

Atwood, EUV Source Candidates for Clean, Collectable 13-14 nm Wavelength Radiation, class illustrations for Chapter 6 of Soft X-rays and Extreme Ultraviolet Radiation: Principles and Applications, *Course AST210*, UC Berkeley, (Jan. 2004).

(Continued)

*Primary Examiner*—Mark H Paschall
(74) *Attorney, Agent, or Firm*—Proskauer Rose LLP (57) ABSTRACT

An electromagnetic radiation source includes a toroidal chamber that contains an ionizable medium. The electromagnetic radiation source also includes a magnetic core that surrounds a portion of the toroidal chamber. The electromagnetic radiation source also includes a pulse power system for providing pulses of energy to the magnetic core for delivering power to a plasma formed in the toroidal chamber to produce electromagnetic radiation that radiates radially through walls of the toroidal chamber.

40 Claims, 8 Drawing Sheets

U.S. PATENT DOCUMENTS

| | | | |
|---|---|---|---|
| 6,421,421 B1 | 7/2002 | McGeoch | 378/119 |
| 6,486,431 B1 | 11/2002 | Smith et al. | 219/121.57 |
| 6,541,786 B1 | 4/2003 | Partlo et al. | 250/504 R |
| 6,552,296 B2 | 4/2003 | Smith et al. | 219/121.43 |
| 6,559,408 B2 | 5/2003 | Smith et al. | 219/121.57 |
| 6,566,668 B2 | 5/2003 | Rauch et al. | 250/504 R |
| 6,678,037 B2 | 1/2004 | Van Elp et al. | 355/67 |
| 6,804,327 B2 | 10/2004 | Schriever et al. | 378/119 |
| 6,815,633 B1 | 11/2004 | Chen et al. | 219/121.54 |
| 6,815,700 B2 | 11/2004 | Melnychuk et al. | 250/504 R |
| 6,826,451 B2 | 11/2004 | del Puerto et al. | 700/245 |
| 6,838,684 B2 | 1/2005 | Bakker et al. | 250/492.2 |
| 6,881,971 B2 | 4/2005 | Ahmad | 250/504 R |
| 6,894,298 B2 | 5/2005 | Ahmad et al. | 250/504 R |
| 7,166,816 B1 * | 1/2007 | Chen et al. | 219/121.41 |
| 2002/0154279 A1 | 10/2002 | Koster et al. | 335/30 |
| 2002/0163313 A1 | 11/2002 | Ness et al. | 315/111.01 |
| 2002/0167282 A1 | 11/2002 | Kirkpatrick et al. | 315/248 |
| 2002/0186814 A1 | 12/2002 | McGeoch | 378/119 |
| 2002/0186815 A1 | 12/2002 | McGeoch | 378/119 |
| 2003/0006383 A1 | 1/2003 | Melnychuk et al. | 250/504 |
| 2003/0011322 A1 | 1/2003 | Popov | 315/248 |
| 2003/0057877 A1 | 3/2003 | Kurachi et al. | 315/248 |
| 2003/0068012 A1 | 4/2003 | Ahmad et al. | 378/119 |
| 2003/0222557 A1 | 12/2003 | Kurachi et al. | 313/46 |
| 2004/0036423 A1 | 2/2004 | Lezcano et al. | 315/248 |
| 2004/0108473 A1 | 6/2004 | Melnychuk et al. | 250/504 |
| 2005/0284576 A1 * | 12/2005 | America et al. | 156/345.43 |

FOREIGN PATENT DOCUMENTS

| | | |
|---|---|---|
| RU | 2022917 C1 | 11/1994 |
| WO | WO 90/13136 A | 11/1990 |

OTHER PUBLICATIONS

Kandlikar, "Heat Transfer Characteristics in Partial Boiling, Fully Developed Boiling, and Significant Void Flow Regions of Subcooled Flow Boiling," *Journal of Heat Transfer* (Feb. 2, 1998) pp. 1-7.

Kaneda et al., "Plasma parameters in noble-gas narrow-tube and capillary-tube discharge, positive column plasma," *J. Phys. D: Appl. Phys*, vol. 23 (1990) pp. 500-503.

Kapteyn, "Compact Coherent EUV Sources", presented at Workshop for users of the Proposed Argonne Linear Free-electron Laser Facility (ALFF), *Argonne National Laboratory*, Argonne, IL (Oct. 30-31, 2003).

Lebert et al., "A gas discharged based radiation source for EUV-lithography," *Microelectronic Engineering*, vol. 46 (1999) pp. 449-452.

Liberman et al., *Physics of High-Density Z-Pinch Plasmas*, Springer-Verlag, New York, (1999) pp. 1-277.

McGeoch, "Progress on the Astron EUV Source," presented at the International SEMATECH 2001 Next Generation Lithography Workshop (Aug. 29, 2001) pp. 1-9.

Mohanty et al., "A novel fast capillary discharge system emitting intense EUV radiation," *Microelectronic Engineering*, vol. 65 (2003) pp. 47-59.

O'Sullivan et al., "Spectroscopy of a 13.5 nm Laser Plasma Source" *International SEMATECH EUVL Source Workshop* (Oct. 2002) pp. 1-31.

Pouvesle et al., "Discharge-based sources of XUV-X radiations: development and applications," *Plasma Sources Science and Technology* vol. 12 (2003) pp. S43-S50.

Teramoto et al., "High repetition rate MPC generator-driven capillary Z-pinch EUV source," SPIE $29^{th}$ Annual International Symposium on Microlithography, Santa Clara, CA (Feb. 22-27, 2004) pp. 1-23.

Teramoto et al., "Radiation Characteristics of a Capillary Z-Pinch EUV Source," $2^{nd}$ International EUVL Symposium, Antwerp, Belgium (Sep. 30-Oct. 2, 2003) pp. 1-18.

Wheeler et al., "The high-power constricted plasma discharge col. I. Theoretical analysis," *J. Phys. D: Appl. Phys*, vol. 3 (1970) pp. 1374-1380.

Wheeler, "The high-power constricted plasma discharge col. II. Experimental investigation," *J. Phys. D: Appl. Phys*, vol. 4 (1971) pp. 400-408.

F. Inasaka et al., "Critical heat flux multiplier of subcooled flow boiling for non-uniform heating conditions in a swirl tube," *Fusion Engineering and Design*, vol. 28, 1995, pp. 53-58.

A. Hassanein et al., "Candidate Plasma-Facing Materials for EUV Lithography Source Components," *Emerging Lithographic Technologies VII, Proceedings of the SPIE*, vol. 5037, 2003, pp. 358-369.

M. McGeoch et al., "Star Pinch Scalable EUV Source," *Emerging Lithographic Technologies VII, Proceedings of the SPIE*, vol. 5037, 2003, pp. 141-146.

Pankert et al., "Integrating Philips' extreme UV source in the alpha-tools", Proceedings of SPIE, vol. 5751, pp. 260-271 (2005).

Kogan et al., "Methods of Experimental Investigation and Measurement," Institute of Thermophysics, Novosibirsk, vol. 31, No. 1, Jan./Feb. 1993, pp. 105-110.

Shao et al., "Vacuum Ultraviolet Light Source Using Electrodeless Discharge," Japanese Journal of Applied Physics, vol. 25, No. 1, Jan. 1986, pp. 64-67.

Cremers et al., "Evaluation of the Continous Optical Discharge for Spectrochemical Analysis," Spectrochimica Acta, vol. 40B, No. 4, 1985, pp. 665-679.

Franzen, CW Gas Breakdown in Argon Using 10.6-p.m Laser Radiation, App. Phys. Lett., vol. 21, No. 2, Jul. 15, 1972, pp. 62-64.

"Novellus Charts Early Lead in UV-Assisted Thermal Processing Technology for Post-Deposition Treatment of Advanced Films," San Jose, CA, Novellus Systems, Inc., Nov. 30, 2004.

Teramoto et al., "Xe- and Sn-Fueled Z-Pinch EUV Source Development Aiming at HVM," $4^{th}$ EUVL Symposium, San Diego, CA, Nov. 7-9, 2005, pp. 1-19.

Horiike, "Asia Pacific Regional Update," EUVA/ASET (Japan), 2005 EUVL Symposium, San Diego, CA.

* cited by examiner

INDUCTIVELY-DRIVEN PLASMA LIGHT SOURCE

RELATED APPLICATIONS

This application claims priority to U.S. provisional application Ser. No. 60/722,605 filed on Sep. 30, 2005, and entitled "Inductively-Driven Plasma Light Source," the entirety of which is hereby incorporated herein by reference.

FIELD OF THE INVENTION

The invention relates to methods and apparatus for generating a plasma, and more particularly, to methods and apparatus for providing an inductively-driven plasma light source.

BACKGROUND OF THE INVENTION

Plasma discharges can be used in a variety of applications. For example, a plasma discharge can be used to excite gases to produce activated gases containing ions, free radicals, atoms and molecules. Plasma discharges also can be used to produce electromagnetic radiation (e.g., light). The electromagnetic radiation produced as a result of a plasma discharge can itself be used in a variety of applications. For example, electromagnetic radiation produced by a plasma discharge can be a source of illumination for curing materials in a semiconductor fabrication system.

SUMMARY OF THE INVENTION

In one embodiment, the present invention features an electromagnetic radiation source for curing a thin film material.

The invention, in one aspect, features an electromagnetic radiation source that includes a toroidal chamber containing an ionizable medium. The source also includes a magnetic core that surrounds a portion of the toroidal chamber. The source also includes a pulse power system for providing pulses of energy to the magnetic core for delivering power to a plasma formed in the toroidal chamber to produce electromagnetic radiation that radiates radially through walls of the toroidal chamber.

In some embodiments, the electromagnetic radiation radiated radially through the walls of the toroidal chamber substantially uniformly illuminates a surface of a semiconductor wafer. In some embodiments, the source includes a reflector for directing a portion of the electromagnetic radiation towards a material. In some embodiments, the ionizable medium includes xenon, tin, zinc, cadmium, or mercury. In some embodiments, the ionizable medium includes a mixture of mercury and a noble gas. In some embodiments, the mixture includes about 20 to about 200 $\mu g/cm^3$ of mercury and about 1 to about 10 $\mu g/cm^3$ of xenon. In some embodiments, the ionizable medium comprises a mixture of mercury and one or more of krypton, neon and xenon. In some embodiments, the electromagnetic radiation is substantially produced by ions of the ionizable medium.

In some embodiments, the at least one pulse of energy is a plurality of pulses between about 2 $\mu s$ and about 10 $\mu s$ with a period of about 80 $\mu s$. In some embodiments, the at least one pulse of energy is a pulse of about 800 volts and at about 1000 amps. The pulse power system can deliver pulses of energy of the same polarity, alternating polarity, or of any sequence of polarity. In some embodiments, the pulse power system includes a bridge circuit (e.g., half bridge or full bridge) and delivers pulses of energy to the magnetic core of alternating polarity or sequences of varying polarity. In some embodiments, the magnetic core is a plurality of cores each surrounding a portion of the toroidal chamber. In some embodiments, the plurality of cores surrounds less than about 10% of the circumference of the toroidal chamber. In some embodiments, the magnetic core is two or more (e.g., three) magnetic cores each surrounding a portion of the toroidal chamber and uniformly distributed along the circumference of the toroidal chamber. In some embodiments, the toroidal chamber is substantially transparent to UV radiation. In some embodiments, the toroidal chamber includes quartz.

In some embodiments, the source includes a processing chamber that receives the electromagnetic energy that radiates radially through the walls of the toroidal chamber. In some embodiments, the processing chamber contains a semiconductor wafer and the electromagnetic energy radiated through the walls of the chamber cures a thin film on or over the semiconductor wafer. In some embodiments, the source includes a reflector positioned relative to the toroidal chamber to reflect a portion of the electromagnetic radiation that radiates radially through the walls of the toroidal chamber for use in processing. In some embodiments, the electromagnetic energy radiated through the walls of the toroidal chamber interacts with an oxygen containing compound to produce ozone. In some embodiments, the source includes a cooling gas source (e.g., centrifugal blower, forced draft fan, induced draft fan, or other source of a cooling gas or fluid) configured to direct a flow of gas across an outer surface of the toroidal chamber. The flow of gas may include one or more gases and/or liquids. The flow of gas cools components (e.g., the chamber) of the source. The flow of gas can be a flow of a nitrogen containing gas. The flow of gas can be an oxygen free or substantially oxygen free gas. In some embodiments, the source includes a housing containing the toroidal chamber. In some embodiments, the source includes a cooling gas source (e.g., a centrifugal blower) located in a housing for directing a flow of gas across a surface of the toroidal chamber and electrical components within the housing.

In another aspect, the invention features an electromagnetic radiation source. The source includes a toroidal chamber containing an ionizable medium and a magnetic core that surrounds a portion of the toroidal chamber. The source also includes a pulse power system for providing high energy pulses to the magnetic core for delivering power to a plasma formed in the toroidal chamber to substantially ionize the plasma to produce ultraviolet light that radiates radially through walls of the toroidal chamber.

In another aspect, the invention features an electromagnetic radiation source for curing a thin film material. The source includes a toroidal chamber at least partially transparent to electromagnetic radiation for containing an ionizable medium. The source also includes a magnetic core that surrounds a portion of the toroidal chamber. The source also includes a pulse power system for providing pulses of energy to the magnetic core for delivering power to a plasma formed in the toroidal chamber to produce electromagnetic radiation that radiates radially through walls of the toroidal chamber.

In another aspect, the invention relates to a method for delivering electromagnetic radiation to a thin film material. For example, the thin film can be the result of chemical vapor deposition, a printing process or a spin-on process. The method includes introducing an ionizable medium, capable of generating a plasma, into a toroidal chamber. The method also includes applying at least one pulse of energy to a magnetic core that surrounds a portion of the toroidal chamber such that the magnetic core delivers power to the plasma. The method also includes directing the electromagnetic radiation emitted by the plasma radially through walls of the toroidal chamber towards a thin film material.

In another aspect, the invention features an electromagnetic radiation source for curing a thin film material. The source includes a toroidal chamber at least partially transparent to electromagnetic radiation for containing an ionizable medium. The source also includes a magnetic core that surrounds a portion of the toroidal chamber. The source also includes means for providing pulses of energy to the magnetic core for delivering power to a plasma formed in the toroidal chamber to produce electromagnetic radiation that radiates radially through walls of the toroidal chamber.

In another aspect, the invention relates to a method for producing electromagnetic radiation. The method involves introducing an ionizable medium capable of generating a plasma into a toroidal chamber. The method also involves applying at least one pulse of energy to a magnetic core that surrounds a portion of the toroidal chamber such that the magnetic core delivers power to the plasma. The method also involves directing electromagnetic energy emitted by the plasma radially through walls of the toroidal chamber.

In some embodiments, the method involves illuminating a surface of a semiconductor wafer with the electromagnetic energy emitted by the plasma radially through the walls of the toroidal chamber. In some embodiments, the method involves illuminating a thin film material with the electromagnetic energy emitted by the plasma radially through the walls of the toroidal chamber. The thin film material can be a dielectric material.

In some embodiments, the method involves reflecting a portion of the electromagnetic radiation towards a thin film material. In some embodiments, the electromagnetic radiation is substantially produced by ions of the ionizable medium. The at least one pulse of energy can be a plurality of pulses of between about 2 $\mu$s to about 10 $\mu$s with a period of about 80 $\mu$s. The magnetic core can be a plurality of cores each surrounding a portion of the toroidal chamber. The toroidal chamber can be substantially transparent to UV radiation.

In some embodiments, the method involves providing the electromagnetic radiation that radiates radially through the walls of the toroidal chamber to a processing chamber. In some embodiments, the method involves directing the electromagnetic energy radiated through the walls of the toroidal chamber into a process chamber to cure a thin film over a semiconductor wafer. In some embodiments, the method involves interacting the electromagnetic energy radiated through the walls of the toroidal chamber with an oxygen containing compound to produce ozone. In some embodiments, the method involves directing a flow of gas across an outer surface of the toroidal chamber.

The invention, in another aspect, features an electromagnetic radiation source that includes a toroidal chamber for generating electromagnetic radiation. The source also includes a housing enclosing the chamber and being sealed to maintain a substantially oxygen-free environment therein. The source also includes a cooling gas source for circulating a cooling gas (e.g., nitrogen) through the housing to cool the toroidal chamber.

In some embodiments, the source also includes at least one magnetic core located in the housing that surrounds a portion of the toroidal chamber. In some embodiments, the source also includes a pulse power system for providing pulses of energy to the magnetic core for delivering power to a plasma formed in the toroidal chamber to produce electromagnetic radiation that radiates radially through walls of the toroidal chamber. In some embodiments, the source includes a heat exchanger located in the housing to cool the cooling gas after cooling the toroidal chamber.

The invention, in another aspect, features an electromagnetic radiation source that includes a toroidal chamber containing an ionizable medium. The source also includes a magnetic core that surrounds a portion of the toroidal chamber. The source also includes a pulse power system for providing pulses of energy of alternating polarity to the magnetic core for delivering power to a plasma formed in the toroidal chamber to produce electromagnetic radiation that radiates radially through walls of the toroidal chamber. In one embodiment, the amount of material used in the magnetic cores can be reduced by operating the source by providing pulses of energy of alternating polarity.

DETAILED DESCRIPTION OF ILLUSTRATIVE EMBODIMENTS

Figure 1:
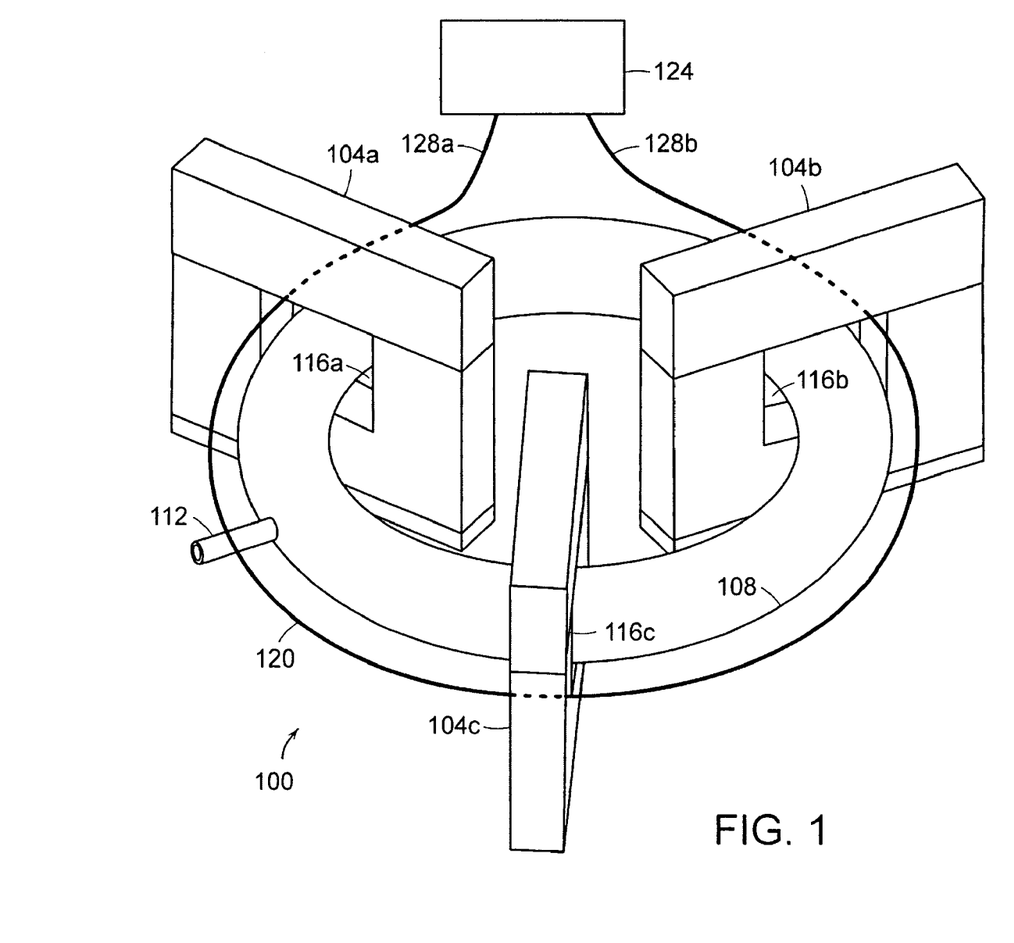
FIG. 1 is an isometric view of a portion of an electromagnetic radiation source that embodies the invention.

FIG. 1 is an isometric view of a portion of an electromagnetic radiation source 100 that incorporates principles of the present invention. The source 100 includes a toroidal chamber 108. In this embodiment, the toroidal chamber 108 is fabricated using quartz material that is substantially transparent to ultraviolet (UV) radiation. An ionizable medium (e.g., xenon, tin, zinc, cadmium, or mercury) is introduced into the toroidal chamber 108 via an inlet 112. In some embodiments, the inlet 112 is sealed off after the introduction of the ionizable medium. In some embodiments, the inlet 112 is connected to a gas pumping system (not shown) to, for example, introduce a gas (e.g., an ionizable medium) to the interior of the toroidal chamber 108. In some embodiments, the toroidal chamber includes an outlet (not shown) to permit gas to flow out of the toroidal chamber 108.

In this embodiment, the source 100 also includes three magnetic cores 104a, 104b and 104c (generally 104) uniformly spaced along the circumference of the toroidal chamber 108. The magnetic cores 104a, 104b and 104c each define an interior passage 116a, 116b and 116c. The toroidal chamber 108 is disposed relative to the magnetic cores 104a, 104b and 104c such that a portion of the toroidal chamber 108 passes through the interior passage 116a, 116b and 116c, respectively, of the magnetic cores 104. The ionizable medium is used to generate a toroidal plasma within the interior of the toroidal chamber 108. The magnetic cores 104 are linked by a primary winding 120 (i.e., the primary winding 120 passes through the interior passages 116a, 116b and 116c of the magnetic cores 104) forming a primary circuit of a transformer that is used to induce the electric current in the toroidal chamber 108.

In some embodiments, the source has a separate primary winding 120 that passes through a passage of one of the magnetic cores 104. By way of example, a first primary winding can pass through the interior passage 116a of magnetic core 104a; a second primary winding can pass through the interior passage 116b of magnetic core 104b; and a third primary winding can pass through the interior passage 116c of magnetic core 104c. The windings (first, second and third) can be electrically connected in series or in parallel as need to achieve a desired transformer ratio of the source 100.

A power system 124 is coupled to ends 128a and 128b of the primary winding 120 and is in electrical communication with the magnetic cores 104. The power system 124 induces an electric current inside the toroidal chamber 108 that produces the toroidal plasma. The toroidal plasma functions as the secondary circuit of the transformer according to Faraday's law of induction. The toroidal plasma produces electromagnetic radiation (e.g., UV radiation) that radiates radially through walls of the toroidal chamber 108 towards, for example, a thin film dielectric material. In some embodiments, the source 100 produces ultraviolet radiation that is used for cleaning semiconductor wafers or flat panels.

In this embodiment, the chamber 108 is a toroidal chamber that has a generally uniform circular cross section along the circumference of the chamber. Alternative chamber shapes can be used in various embodiments of the invention. For example, the chamber 108 could have an oval, square, or rectangular cross section along all or along a portion of the circumference of the chamber. In some embodiments, the chamber is an ovoid-shaped chamber.

Figure 2A:
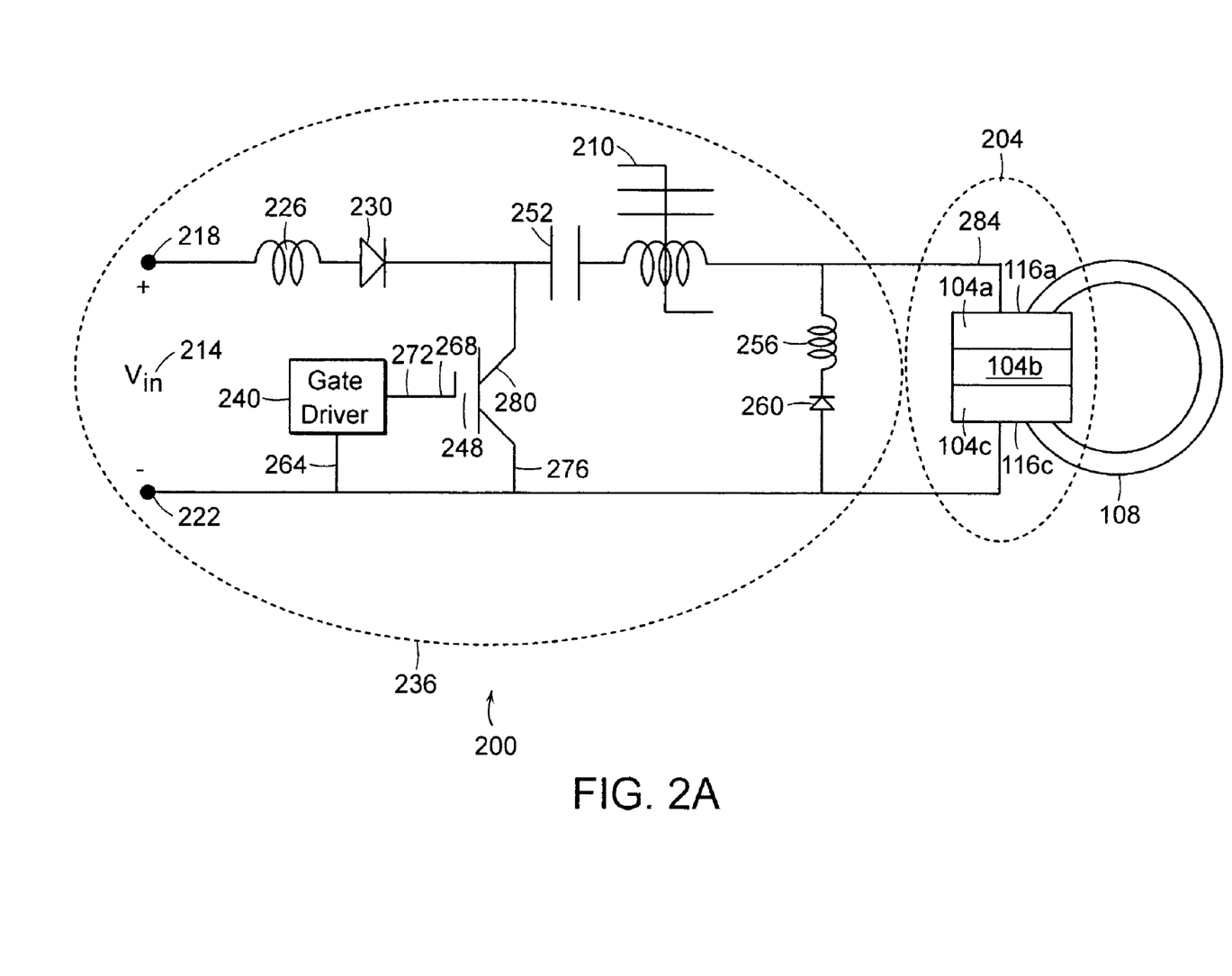
FIG. 2A is a schematic electrical circuit model of a power system used in conjunction with an electromagnetic radiation source, according to an illustrative embodiment of the invention.

FIG. 2A is a schematic electrical circuit model 200 of a power system 236 used with, for example, the electromagnetic radiation source 100 of FIG. 1. In this embodiment, the power system 236 is a pulse power system that delivers at least one pulse of energy to the magnetic cores 104a, 104b and 104c. In this embodiment, the power system 236 delivers pulses of energy of the same polarity to the magnetic cores 104a, 104b and 104c. In operation, the power system 236 typically delivers a series of pulses of energy to the magnetic cores 104a, 104b and 104c for delivering power to the plasma. The power system 236 delivers pulses of energy to a primary circuit 204 of a transformer (where the toroidal plasma located in the toroidal chamber 108 is the secondary circuit of the transformer). The pulses of energy induce a flow of electric current in the magnetic cores 104 that delivers power to the toroidal plasma in the toroidal chamber 108. The magnitude of the power delivered to the toroidal plasma depends on the magnetic field produced by the magnetic cores 104 and the frequency and magnitude of the pulses of energy delivered to the transformer.

In some embodiments, the power system 236 delivers pulses of energy of the same polarity, alternating polarity, or of any sequence of polarity. For example, in some embodiments, the power system 236 is modified to include a bridge circuit (e.g., half bridge or full bridge) and delivers pulses of energy to the magnetic cores 104a, 104b and 104c of alternating polarity or sequences of varying polarity. In some embodiments, the power system 236 provides a plurality of pulses to the magnetic core 104. The pulses are provided for a duration between about 2 μs and about 4 μs and have a period of about 100 μs. In some embodiments, the power system 236 provides at least one pulse of energy at about 800 volts and at about 1000 amps. In some embodiments, the power system 236 provides at least one pulse of current greater than about 100 amps. In some embodiments, the power system 236 provides at least one pulse of energy greater than about 0.5 Joules per pulse.

In this embodiment, the power system 236 includes a source of DC voltage 214 that has a positive voltage terminal 218 and a negative voltage terminal (or ground) 222. The positive voltage terminal 218 is in series with an inductor 226 and a diode 230. The inductor 226 and diode 230 are used to charge capacitor 252 with the energy which will be transferred to the plasma when transistor 248 is turned on.

The power system 236 also includes a gate driver 240 and the transistor 248. The gate terminal 268 of the transistor 248 is connected to an output 272 of the gate driver 240. The input 264 of the gate driver 240 is connected to the negative voltage terminal 222. The source terminal 276 of the transistor 248 is connected to the negative voltage terminal 222. The drain terminal 280 of the transistor 248 is connected to the output of the diode 230 and to one connection of a capacitor 252. The other connection to the capacitor 252 is connected to one side of an optional inductor 210. In this embodiment, the inductor 210 is a saturable inductor. The other connection to the inductor 210 is connected to a conductor 284 that passes through the passages 116 of the magnetic cores 104. The conductor 284 is the primary winding of a transformer, for example, the primary winding 120 of FIG. 1. The conductor 284 then terminates at the negative voltage terminal 222. The inductor 210 is a magnetic switch that delivers energy stored in the capacitor 252 to the magnetic cores 104 when the inductor 210 becomes saturated. The inductor 210 delays the point in time when the energy stored in the capacitor 252 is delivered to the magnetic cores 104. In some embodiments, the optional inductor 210 reduces energy dissipation in the transistor 248. An inductor 256 and diode 260 are connected in parallel with the magnetic cores 104 and function to provide a bias current which resets the magnetic cores 104 between pulses. When the gate driver 240 delivers a pulse to the gate 268 of transistor 248, the transistor 248 conducts current, discharging the energy stored in capacitor 252 in a pulse through the magnetic cores 104 and into the plasma in the toroidal chamber 108. Subsequently the capacitor 252 is recharged by the action of the inductor 226 and diode 230.

In some embodiments, the power system 236 provides high energy pulses to the magnetic core 104 for delivering power to a plasma formed in the toroidal chamber 108. The high energy pulses substantially ionize the ionizable medium to produce electromagnetic radiation that is substantially ultraviolet radiation that radiates radially through walls of the toroidal chamber 108.

Figure 2B:
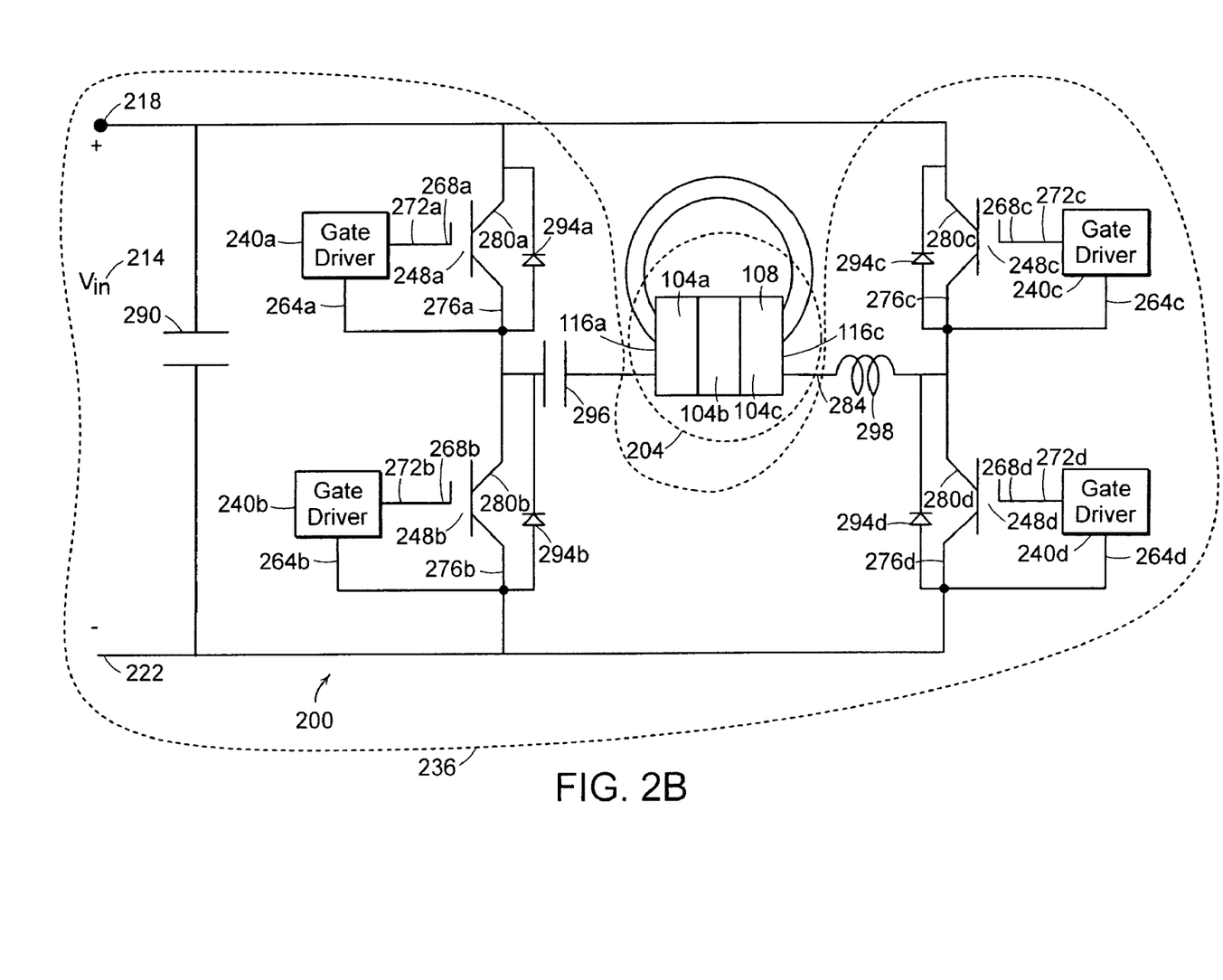
FIG. 2B is a schematic electrical circuit model of a power system used in conjunction with an electromagnetic radiation source, according to an illustrative embodiment of the invention.
Figure 3A:
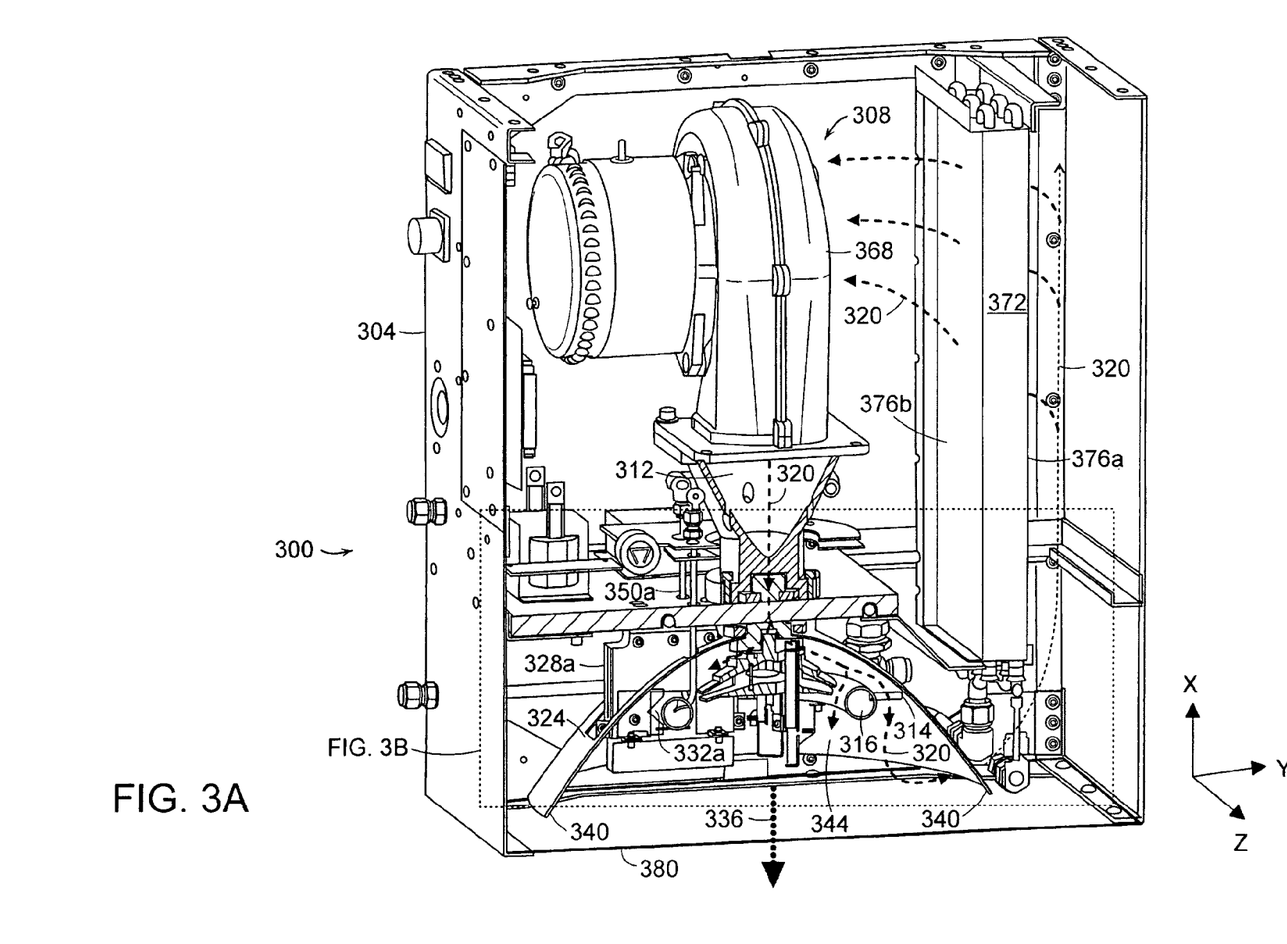
FIG. 3A is a schematic cross-sectional view of an electromagnetic radiation source, according to an illustrative embodiment of the invention.
Figure 3B:
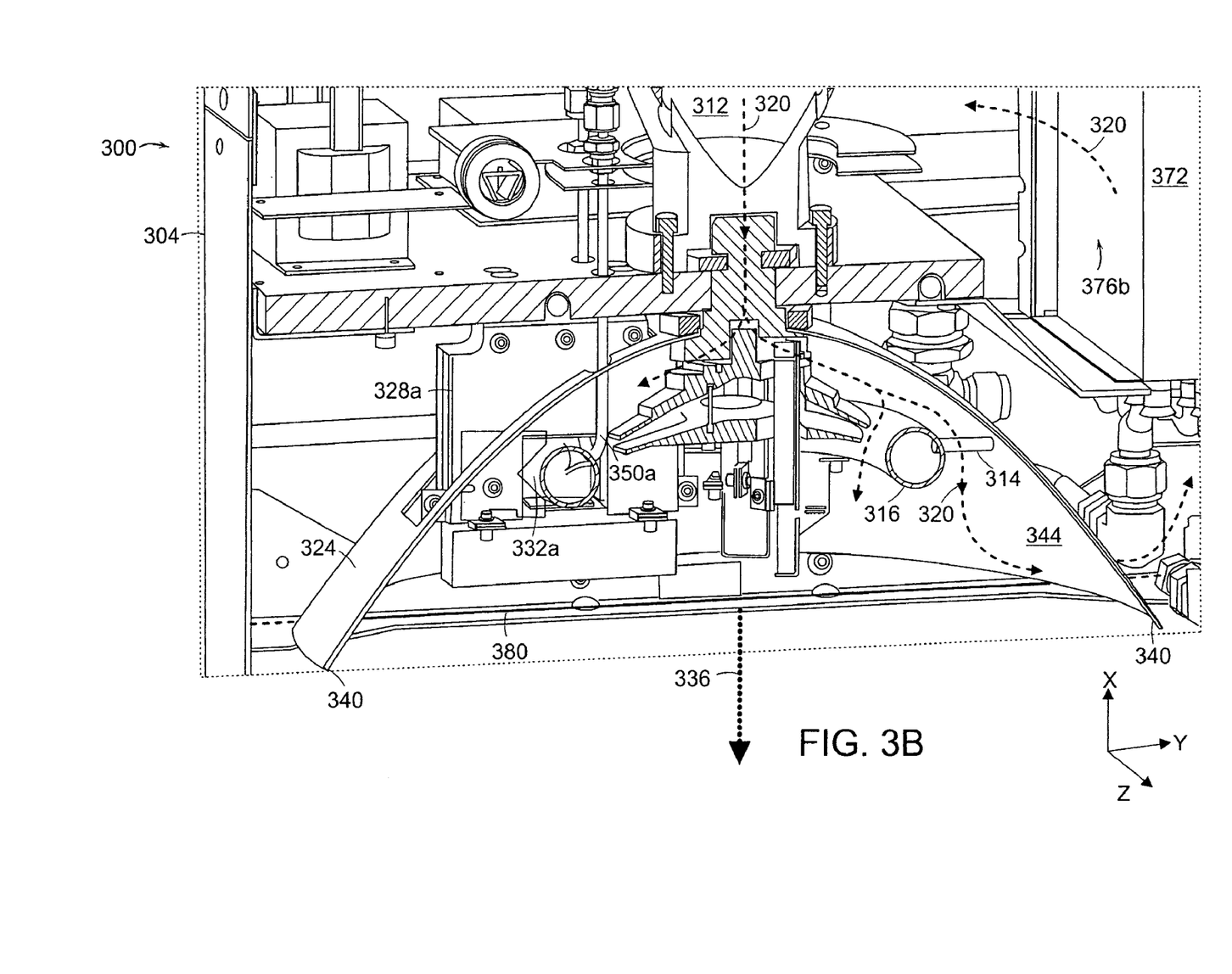
FIG. 3B is an expanded view of a portion of the electromagnetic radiation source of FIG. 3A.
Figure 3C:
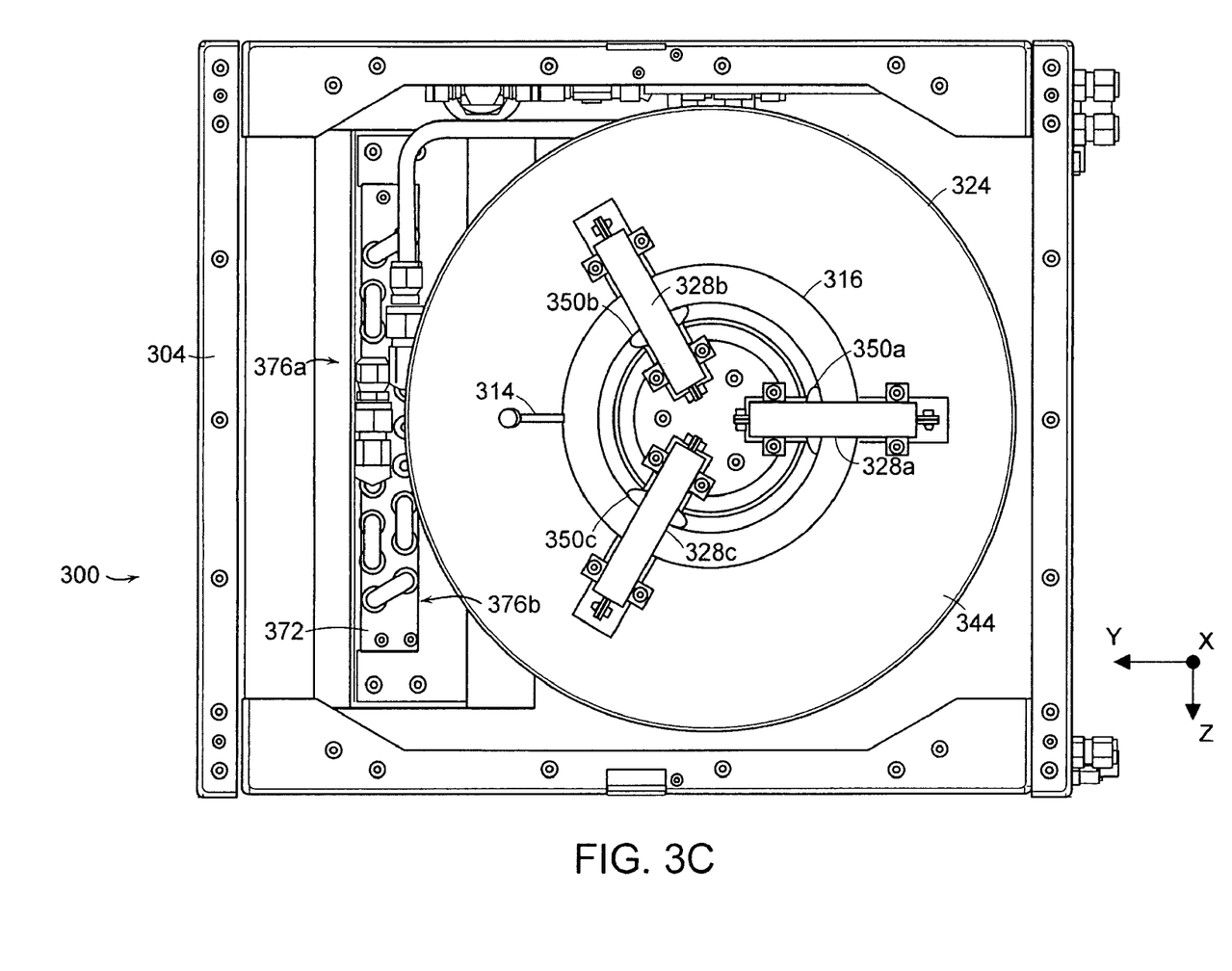
FIG. 3C is a two-dimensional view of a portion of the chamber, reflector and magnetic cores of the electromagnetic radiation source of FIG. 3A.

FIG. 2B is a schematic electrical circuit model 200 of a power system 236 used with, for example, the electromagnetic radiation source 100 of FIG. 1 or electromagnetic radiation source 300 of FIGS. 3A, 3B and 3C. In this embodiment, the power system 236 includes a full bridge circuit and delivers pulses of energy of alternating polarity to the magnetic cores 104a, 104b and 104c. In operation, the power system 236 typically delivers a series of pulses of energy to the magnetic cores 104a, 104b and 104c for delivering power to a plasma in a toroidal chamber 108 of the electromagnetic radiation source. The power system 236 delivers pulses of energy to a primary circuit 204 of a transformer (where the toroidal plasma located in the toroidal chamber 108 is the secondary circuit of the transformer). The pulses of energy induce a flow of electric current in the magnetic cores 104 that delivers power to the toroidal plasma in the toroidal chamber 108. The magnitude of the power delivered to the toroidal plasma depends on the magnetic field produced by the magnetic cores 104 and the frequency and magnitude of the pulses of energy delivered to the transformer.

In one embodiment, the pulses of energy provided to the magnetic cores 104 are provided for a duration between about 2 μs and about 4 μs and have a period of about 100 μs. In some embodiments, the power system 236 provides at least one pulse of energy at about 800 volts and at about 1000 amps. In some embodiments, the power system 236 provides at least one pulse of current greater than about 100 amps. In some embodiments, the power system 236 provides at least one pulse of energy greater than about 0.5 Joules per pulse.

In this embodiment, the power system 236 includes a source of DC voltage 214 that has a positive voltage terminal 218 and a negative voltage terminal (or ground) 222. A capacitor 290 is located in parallel with the DC voltage source 214. A first end of the capacitor 290 is connected to the positive voltage terminal 218 and the second end of the capacitor 290 is connected to the negative voltage terminal 222. In some embodiments, the capacitor 290 filters out high frequency spikes that the source of DC voltage 214 may output. In some embodiments, the capacitor 290 is a source of current for the power system 236 when pulses of energy are delivered to the magnetic cores 104. In some embodiments, the capacitor 290 is a filter and a source of current.

The power system 236 also includes four gate drivers 240a, 240b, 240c and 240d (generally 240). The power system 236 also includes four transistors 248a, 248b, 248c and 248d (generally 248) that are operatively connected to the four gate drivers 240a, 240b, 240c and 240d, respectively. Each gate driver 240 has an input 264 and an output 272. Each transistor 248 has a gate terminal 268, a drain terminal 280, and a source terminal 276. The gate terminal 268 of the transistor 248 is connected to the output 272 of the gate driver 240. The power system also includes four diodes 294a, 294b, 294c and 294d (generally 294). A first end of the diode 294 is connected to the drain terminal 280 of the transistor 248. A second end of the diode 294 is connected to the source terminal 276 of the transistor 248.

The drain terminal 280a of the transistor 248a is connected to the positive voltage terminal 218. The source terminal 276a of the transistor 248a is connected to the drain terminal 280b of the transistor 248b. The source terminal 276b of the transistor 248b is connected to the negative voltage terminal 222. The drain terminal 280c of the transistor 248c is connected to the positive voltage terminal 218. The source terminal 276c of the transistor 248c is connected to the drain terminal 280d of the transistor 248d. The source terminal 276d of the transistor 248d is connected to the negative voltage terminal 222.

The power system 236 also includes a capacitor 296 and an inductor 298. A first end of the capacitor 296 is connected to the source terminal 276a of the transistor 248a and the drain terminal 280b of transistor 248b. The second end of the capacitor 296 is connected to a first end of a conductor 284 that passes through the passages 116 of the magnetic cores 104. The second end of the conductor 284 is connected to a first end of the inductor 298. The second end of the inductor 298 is connected to the source terminal 276c of the transistor 248c and the drain terminal 280d of transistor 248d.

In some embodiments, the inductor 298 is an electrical component. In some embodiments, the inductor 298 is inductance due to leakage current in the transformer (the conductor 284 is the primary winding and the plasma loop in the chamber 108 is the secondary circuit of the transformer). The inductor 298 may be a saturable inductor. In some embodiments, the capacitor 296 resonates with the inductor 298 to produce a sinusoidal pulse of current that is delivered to the magnetic cores 104. In some embodiments, the capacitor 296 blocks DC current from being delivered to the magnetic cores 104.

When the gate driver 240 delivers a pulse to the gate 268 of transistor 248, the transistor 248 conducts current. In one embodiment, the power system 236 is controlled such that gate driver 240a delivers a pulse to the gate terminal 268a and the gate driver 240d delivers a pulse to the gate terminal 268d causing current to flow in one direction through the conductor 284 to deliver a pulse energy to the magnetic cores 104 and into the plasma in the toroidal chamber 108. The power system 236 then commands the gate driver 240a to command the transistor 248 to no longer conduct current and the gate driver 240d to command the transistor to no longer conduct current. The power system 236 then commands the gate driver 240b to deliver a pulse to the gate terminal 268b and the gate driver 240c to deliver a pulse to the gate terminal 268c causing current to flow in the opposite direction through the conductor 284 to deliver a pulse energy (of opposite polarity) to the magnetic cores 104 and into the plasma in the toroidal chamber 108. In this manner, the power system 236 provides pulses of energy to the magnetic cores of alternating polarity.

In some embodiments of the invention, it is desirable for the power system 236 to provide pulses of energy of alternating polarity to the magnetic cores 104 to prevent the magnetic cores 104 from saturating as easily as they would with repetitive pulses of energy of the same polarity. One benefit of the power system 236 providing pulses of energy of alternating polarity is that less magnetic core material is needed during operation because the magnetic cores are used more efficiently and the likelihood of the magnetic cores saturating during operation is reduced. An additional benefit of using less magnetic core material is that the magnetic cores 104 are smaller in size which blocks less light that is emitted by the plasma through the walls of the plasma chamber 108.

In some embodiments, the capacitor 296 has a capacitance of about 3.5 μF and the inductor 298 has an inductance of less than about 1 μH. In some embodiments, the capacitor 296 has a capacitance of greater than about 30 μF and the inductor 298 has an inductance of less than about 1 μH. Alternative values of capacitance and inductance can be used to modify the operation of the power system 236 and the electromagnetic radiation source. By way of example, in one embodiment, when the capacitor 296 has a capacitance of about 3.5 μF and the inductor 298 has an inductance of less than about 1 μH, the shape of the pulses of energy provided by the power system 236 to the magnetic cores 104 is sinusoidal in shape. In contrast, in another embodiment, when the capacitor 296 has a capacitance of greater than about 30 μF and the inductor 298 has an inductance of less than about 1 μH, the shape of the pulses of energy provided by the power system 236 to the magnetic cores 104 is rectangular in shape.

In some embodiments, the power system 236 includes a half bridge circuit. In the half bridge circuit, the gate driver 240c, transistor 248c and diode 294c is replaced with a first capacitor and the gate driver 240d, transistor 248d and diode 294d is replaced with a second capacitor. The first end of the first capacitor is connected to the positive voltage terminal 218. The second end of the first capacitor is connected to the second end of the inductor 298 and the first end of the second capacitor. The second end of the second capacitor is connected to the negative voltage terminal 222.

FIGS. 3A, 3B and 3C are schematic views of an electromagnetic radiation source 300, according to an illustrative embodiment of the invention. Referring to FIG. 3A, the source 300 includes a housing 304 that contains a chamber 316 (e.g., the toroidal chamber 108 of FIG. 1) and three magnetic cores 328a, 328b and 328c (only 328a is shown in FIG. 3A for clarity of illustration purposes). The magnetic cores 328a, 328b and 328c each define an interior passage 332a, 332b and 332c, respectively. The chamber 316 passes through the interior passages 332a, 332b and 332c of the magnetic cores 328a, 328b and 328c. Primary windings 350a, 350b and 350c passes through the interior passages 332a, 332b and 332c, respectively, to form a primary circuit of a transformer, similarly as discussed previously herein. The primary windings 350a, 350b and 350c are electrically connected in series to a power system, for example, the power system 236 of FIG. 2A. The power system provides power to the magnetic cores 328a, 328b and 328c which in turn provide power to a plasma formed in the chamber 316. The power provided to the plasma by the magnetic cores 328a, 328b and 328c ionizes an ionizable medium (e.g., mercury) that is introduced in to the chamber 316 via an inlet 314. The ionized ionizable medium produces ultraviolet radiation that radiates radially through the walls of the chamber 316. In some embodiments, the primary windings 350a, 350b and 350c are electrically connected in parallel to the power system.

The source 300 also includes a reflector 324. The reflector 324 surrounds the chamber 316 so that the electromagnetic radiation radiated radially through the walls of the chamber 316 in directions other than direction 336 is substantially reflected by the reflector 324 towards the direction 336. In this manner, a substantial amount of the electromagnetic radiation exiting the chamber 316 is directed towards and through a window 380 located at the front 340 of the reflector 324 located at the bottom (when viewed in FIG. 3A) of the housing 304.

The window 380 can be, for example, a panel or sheet of material that is transparent or substantially transparent to electromagnetic radiation. In some embodiments, the window 380 is transparent to one or more particular bands of frequencies of electromagnetic radiation. In some embodiments, the inside 344 of the reflector 324 is coated with a material (e.g., film or coating) that enhances the reflective properties of the reflector 324. In one embodiment, the inside 344 of the reflector 324 is coated with a material that minimizes the reflection (e.g., absorbs) of wavelengths of electromagnetic radiation in the infra-red spectrum while reflecting wavelengths of electromagnetic radiation in the ultra-violet radiation. In this manner, operation of the electromagnetic radiation source 300 can be tailored for particular applications.

The source 300 also includes a cooling gas source 308 that provides a flow of gas 320 to a conduit 312 in the housing 304. In this embodiment, the cooling gas source 308 is a centrifugal blower. An exemplary centrifugal blower is a Nautilair™ 8.9" (225 mm) Variable Speed Blower, Model 150240-00 manufactured by Ametek, Inc. with offices in Kent, Ohio. The flow of gas 320 travels through the conduit 312 and is directed towards and through an opening in the reflector 324. The flow of gas 320 is directed across an outer surface of the chamber 316 to cool the chamber during operation. In this manner, the chamber 316 is enveloped in a high velocity gas flow 320. The flow of gas 320 is then directed through the housing 304 towards a heat exchanger 372.

At least a portion of the flow of gas 320 travels along the positive direction of the X-axis and through the heat exchanger 372 (from a first side 376a of the heat exchanger 372 to a second side 376b of the heat exchanger 372). As the flow of gas 320 passes through the heat exchanger 372, heat transfer fins (not shown) of the heat exchanger 372 removes heat from the flow of gas 320. The heat exchanger 372 cools the flow of gas 320 so that it can be re-circulated or re-pumped by the cooling gas source 308 towards the chamber 316. The flow of gas 320 is directed towards and in an inlet 368 of the cooling gas source 308 and is provided to the conduit 312.

In one embodiment, the housing 304 is sealed from the outside environment and the cooling gas source 308 pumps a gas that is substantially free of oxygen (e.g., it is a gas that contains Nitrogen or contains only a small amount of oxygen that does not adversely affect operation of the source 300). The housing 304 encloses the chamber 316 and is sealed to maintain a substantially oxygen-free environment in the housing 304. By pumping a gas that does not contain oxygen, it is possible to minimize or eliminate the production of ozone. Ozone is a reactive gas that could attack or react with the components within the housing 304. Other reasons for eliminating or minimizing ozone production in the housing include, ozone is highly toxic, ozone is expensive to destroy in an air cleaning system after it is formed, and oxygen and ozone will absorb short wavelength UV light reducing the effectiveness of the light source for some applications.

Figure 4:
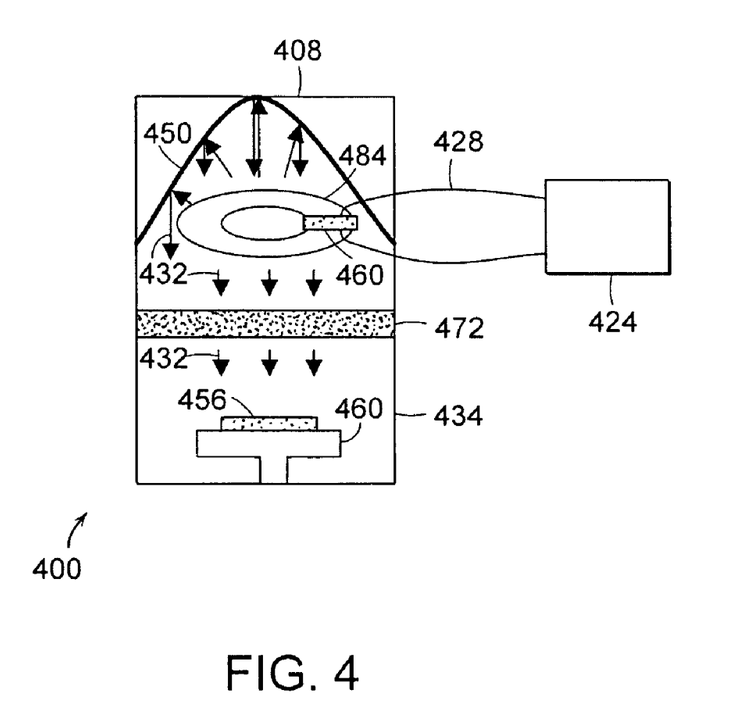
FIG. 4 is a partial schematic illustration of an electromagnetic radiation source and process chamber, incorporating principles of the invention.

FIG. 4 is a partial schematic illustration of an electromagnetic radiation system 400 for producing electromagnetic radiation that embodies the invention. The system 400 includes a housing 408 that contains a chamber 484 (e.g., a toroidal chamber). The system 400 also includes a power supply 424 that provides power via conductor 428 to at least one magnetic core 460. The at least one magnetic core 460 surrounds a portion of the chamber 484. The at least one magnetic core 460 provides power to a plasma formed in the chamber 484, for example, similarly as described previously herein regarding FIGS. 1 and 2A. The plasma formed in the chamber generates electromagnetic radiation 432 that is radiated radially through the walls of the chamber 484.

The system 400 also includes a reflector 450. Some of the electromagnetic radiation 432 radiates directly towards a window 472 coupled to the housing 408. Some of the electromagnetic radiation 432 radiates towards the reflector 450. The reflector reflects this electromagnetic radiation and directs it towards the window 472. The combination of electromagnetic radiation 432 passes through the window 472 in to a process chamber 434. A sample holder 460 positioned in the process chamber 434 supports a material 456 (e.g., a wafer or panel) that is processed by the electromagnetic radiation 432. In one embodiment, the electromagnetic radiation facilitates curing of a thin film material located on the material 456.

Embodiments of the invention can be used in a variety of applications. In one embodiment, an electromagnetic radiation source (e.g., the electromagnetic radiation source 300 of FIGS. 3A, 3B and 3C) is used to deliver ultraviolet electromagnetic radiation through the window 380 to a processing chamber (e.g., the chamber 404 of FIG. 4). The ultraviolet radiation reacts with oxygen in the processing chamber to produce ozone in the processing chamber. The ozone reacts with hydrocarbons on a surface of a specimen located in the processing chamber to remove hydrocarbons on the surface of the specimen. Additional applications are contemplated for use with electromagnetic radiation sources incorporating principles of the invention. For example, electromagnetic radiation source incorporating principles of the invention can be used for curing thin films of material (e.g., dielectric materials) on semiconductor wafers, curing inks and paints, providing UV light as part of an imprint lithography process, treating photoresist used in semiconductor processing or as a light source for lithography used in semiconductor processing.

By way of illustration, the electromagnetic radiation source 300 of FIGS. 3A, 3B and 3C was used in an experiment to generate electromagnetic radiation. A mixture of xenon and mercury was introduced into the chamber 316 via the inlet 314 and the inlet 314 was sealed. The chamber 316 was a toroidally shaped chamber and the inlet 314 was a tubular shaped body fabricated from Suprasil® quartz (Heraeus Quarzschmelze G.m.b.H., Germany). The inlet 314 was sealed by melting and fuising the inlet 314. In this experiment, approximately 4 µg/cm$^3$ of xenon and approximately 35 µg/cm$^3$ of mercury were introduced into the chamber 316. The power system 236 of FIG. 2A was used to provide approximately 8750 watts of power to the three magnetic cores 328a, 328b and 328c. The three magnetic cores 328a, 328b and 328c provided approximately 8750 watts less about 100-200 watts (due to magnetic core losses) of power to a plasma formed in the chamber 316. The repetition rate was 8.75 kHz for the pulses of energy provided to the magnetic cores 328a, 328b and 328c. The energy per pulses was approximately 1 Joule. The total input power to the power system 236 of FIG. 2A was about 9600 watts.

Figure 5:
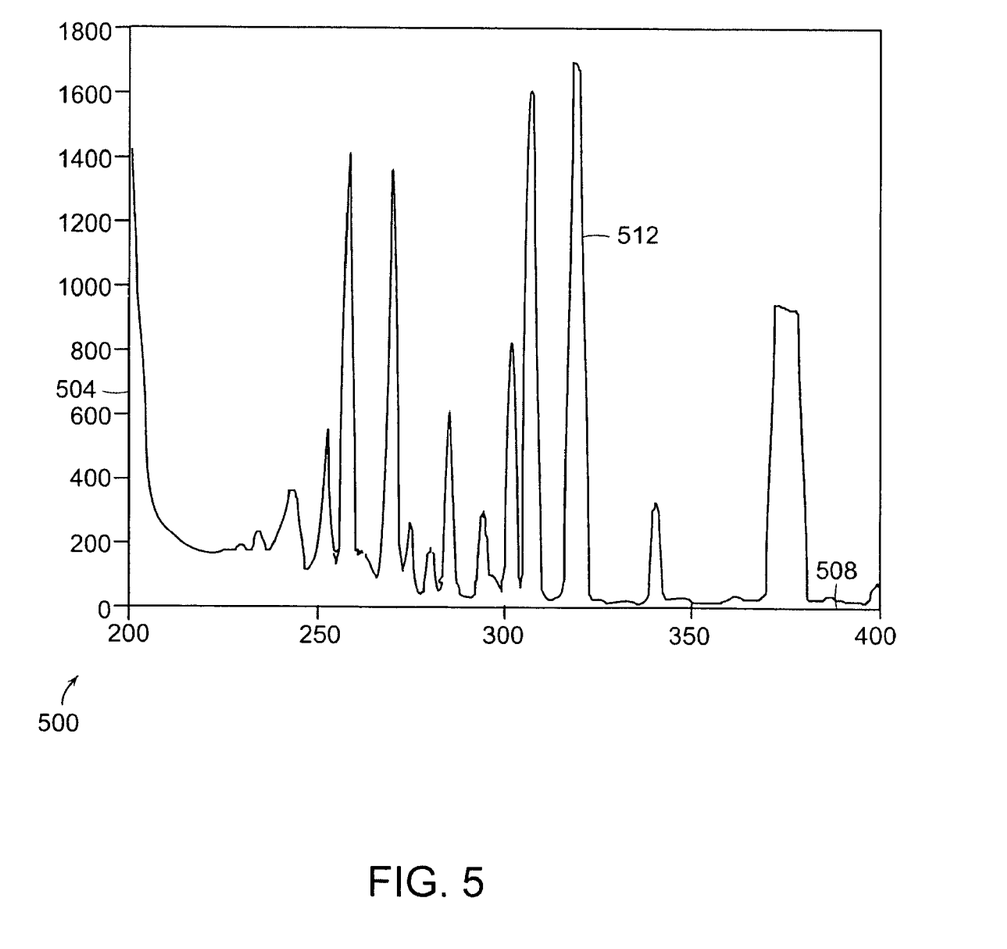
FIG. 5 is a graphical representation of absolute irradiance versus wavelength, using an electromagnetic radiation source according to the invention.

FIG. 5 is a graphical representation of a plot 500 of a measurement of absolute irradiance versus wavelength produced with an electromagnetic radiation source, such as the electromagnetic radiation source 300 of FIGS. 3A, 3B and 3C. The Y-axis 504 of the plot 500 is the absolute irradiance in units of µW/cm$^2$nm. The X-axis 508 of the plot 500 is wavelength of the electromagnetic radiation in units of nm. Curve 512 is the measured absolute irradiance versus wavelength between 200 nm and 400 nm. The irradiance curve 512 was measured using a fiber optic probe positioned about 18 cm from the center of the quartz chamber 316 and collimated to view a 2.5 cm extent of plasma along the toroidal chamber 316.

Variations, modifications, and other implementations of what is described herein will occur to those of ordinary skill in the art without departing from the spirit and the scope of the invention and are considered to be encompassed thereby. Accordingly, the invention is not to be defined only by the preceding illustrative description.

What is claimed is:

1. An electromagnetic radiation source comprising:
   a toroidal chamber containing a plasma formed from an ionizable medium;
   a plurality of magnetic cores that each surround a portion of the toroidal chamber, the plurality of magnetic cores surrounding less than about 10% of the circumference of the toroidal chamber;
   a pulse power system for providing pulses of energy of between about 2 µs to about 10 µs to the plurality of magnetic cores for delivering power to the plasma in the toroidal chamber to produce electromagnetic radiation that radiates radially through walls of the toroidal chamber; and
   a reflector for directing a portion of the radially radiated electromagnetic radiation for use in processing.

2. The source of claim 1, wherein the electromagnetic radiation radiated radially through the walls of the toroidal chamber substantially uniformly illuminates a surface of a semiconductor wafer.

3. The source of claim 1, wherein the radially radiated electromagnetic radiation is directed towards a thin film material.

4. The source of claim 3, wherein the thin film material is a dielectric material.

5. The source of claim 1, wherein the ionizable medium comprises xenon, tin, zinc, cadmium, or mercury.

6. The source of claim 1, wherein the electromagnetic radiation is substantially produced by ions of the ionizable medium.

7. The source of claim 1, wherein the pulses of energy are pulses of about 800 volts at about 1000 amps.

8. The source of claim 1, wherein the pulses of energy are pulses of current greater than about 100 amps.

9. The source of claim 1, wherein the pulses of energy are pulses greater than about 0.5 Joules per pulse.

10. The source of claim 1, wherein the pulse power system delivers energy of the same polarity or alternating polarity to the plurality of magnetic cores.

11. The source of claim 1, wherein the pulse power system comprises a half bridge or full bridge circuit.

12. The source of claim 1, wherein the magnetic cores are uniformly distributed along the circumference of the toroidal chamber.

13. The source of claim 1, wherein the toroidal chamber is substantially transparent to UV radiation.

14. The source of claim 1, wherein the toroidal chamber comprises quartz.

15. The source of claim 1, comprising a processing chamber that receives the electromagnetic radiation that radiates radially through the walls of the toroidal chamber.

16. The source of claim 15, wherein the processing chamber contains a semiconductor wafer and the electromagnetic energy radiated through the walls of the chamber cures a thin film over the semiconductor wafer.

17. The source of claim 1, wherein the electromagnetic energy radiated through the walls of the toroidal chamber interacts with an oxygen containing compound to produce ozone.

18. The source of claim 1, comprising a fan configured to direct a flow of gas across an outer surface of the toroidal chamber.

19. The source of claim 18, wherein the flow of gas is a flow of a nitrogen containing gas.

20. The source of claim 18, wherein the flow of gas is a flow of an oxygen free gas.

21. The source of claim 1, comprising a housing containing the toroidal chamber.

22. The source of claim 21, comprising a fan located in the housing for directing a flow of gas across a surface of the toroidal chamber and electrical components within the housing.

23. The source of claim 1, wherein the ionizable medium comprises a mixture of mercury and a noble gas.

24. The source of claim 23, wherein the mixture comprises about 20 to about 200 µg/cm$^3$ of mercury and about 1 to about 10 µg/cm$^3$ of xenon.

25. The source of claim 1, wherein the ionizable medium comprises a mixture of mercury and one or more of krypton, neon and xenon.

26. The source of claim 1, comprising:
   a housing enclosing the toroidal chamber and being sealed to maintain a substantially oxygen-free environment therein; and
   a cooling gas source for circulating a cooling gas through the housing to cool the toroidal chamber.

27. The source of claim 26, comprising a heat exchanger located in the housing to cool the cooling gas after cooling the toroidal chamber.

28. An electromagnetic radiation source for providing electromagnetic energy comprising:
- a toroidal chamber containing a plasma formed from an ionizable medium;
- a plurality of magnetic cores that each surround a portion of the toroidal chamber, the plurality of magnetic cores surrounding less than about 10% of the circumference of the toroidal chamber;
- a pulse power system for providing high energy pulses of between about 2 μs to about 10 μs to the plurality of magnetic cores for delivering power to the plasma in the toroidal chamber to substantially ionize the ionizable medium and produce ultraviolet light that radiates radially through walls of the toroidal chamber; and
- a reflector for directing a portion of the radially radiated electromagnetic radiation for use in processing.

29. An electromagnetic radiation source for curing a thin film material comprising:
- a toroidal chamber at least partially transparent to electromagnetic radiation for containing a plasma formed from an ionizable medium;
- a plurality of magnetic cores that each surround a portion of the toroidal chamber, the plurality of magnetic cores surrounding less than about 10% of the circumference of the toroidal chamber;
- a pulse power system for providing pulses of energy of between about 2 μs to about 10 μs to the plurality of magnetic cores for delivering power to the plasma in the toroidal chamber to produce electromagnetic radiation that radiates radially through walls of the toroidal chamber; and
- a reflector for directing a portion of the radially radiated electromagnetic radiation toward a thin film material.

30. An electromagnetic radiation source for curing a thin film material comprising:
- a toroidal chamber at least partially transparent to electromagnetic radiation for containing a plasma formed from an ionizable medium;
- a plurality of magnetic cores that each surround a portion of the toroidal chamber, the plurality of magnetic cores surrounding less than about 10% of the circumference of the toroidal chamber;
- means for providing pulses of energy of between about 2 μs to about 10 μs to the plurality of magnetic cores for delivering power to the plasma in the toroidal chamber to produce electromagnetic radiation that radiates radially through walls of the toroidal chamber; and
- a reflector for directing a portion of the radially radiated electromagnetic radiation toward a thin film material.

31. A method for producing electromagnetic radiation comprising:
- generating a plasma in a toroidal chamber;
- applying pulses of energy of between about 2 μs to about 10 μs to a plurality of magnetic cores that each surround a portion of the toroidal chamber such that the plurality of magnetic cores deliver power to the plasma, the plurality of magnetic cores surrounding less than about 10% of the circumference of the toroidal chamber; and
- directing electromagnetic energy emitted by the plasma radially through walls of the toroidal chamber for use in processing.

32. The method of claim 31, comprising illuminating a surface of a semiconductor wafer with the electromagnetic energy emitted by the plasma radially through the walls of the toroidal chamber.

33. The method of claim 31, comprising illuminating a thin film material with the electromagnetic energy emitted by the plasma radially through the walls of the toroidal chamber.

34. The method of claim 33, wherein the thin film material is a dielectric material.

35. The method of claim 31, wherein the toroidal chamber is substantially transparent to UV radiation.

36. The method of claim 31, providing the electromagnetic radiation that radiates radially through the walls of the toroidal chamber to a processing chamber.

37. The method of claim 31, comprising directing the electromagnetic energy radiated through the walls of the toroidal chamber into a process chamber to cure a thin film over a semiconductor wafer.

38. The method of claim 31, comprising interacting the electromagnetic energy radiated through the walls of the toroidal chamber with an oxygen containing compound to produce ozone.

39. The method of claim 31, comprising directing a flow of gas across an outer surface of the toroidal chamber.

40. An electromagnetic radiation source comprising:
- a toroidal chamber containing a plasma formed from an ionizable medium;
- a plurality of magnetic cores that each surround a portion of the toroidal chamber, the plurality of magnetic cores surrounding less than about 10% of the circumference of the toroidal chamber;
- a pulse power system for providing pulses of energy of between about 2 μs to about 10 μs and of alternating polarity to the plurality of magnetic cores for delivering power to the plasma in the toroidal chamber to produce electromagnetic radiation that radiates radially through walls of the toroidal chamber; and
- a reflector for directing a portion of the radially radiated electromagnetic radiation for use in processing.

* * * * *